United States Patent Office 2,953,733
Patented Sept. 20, 1960

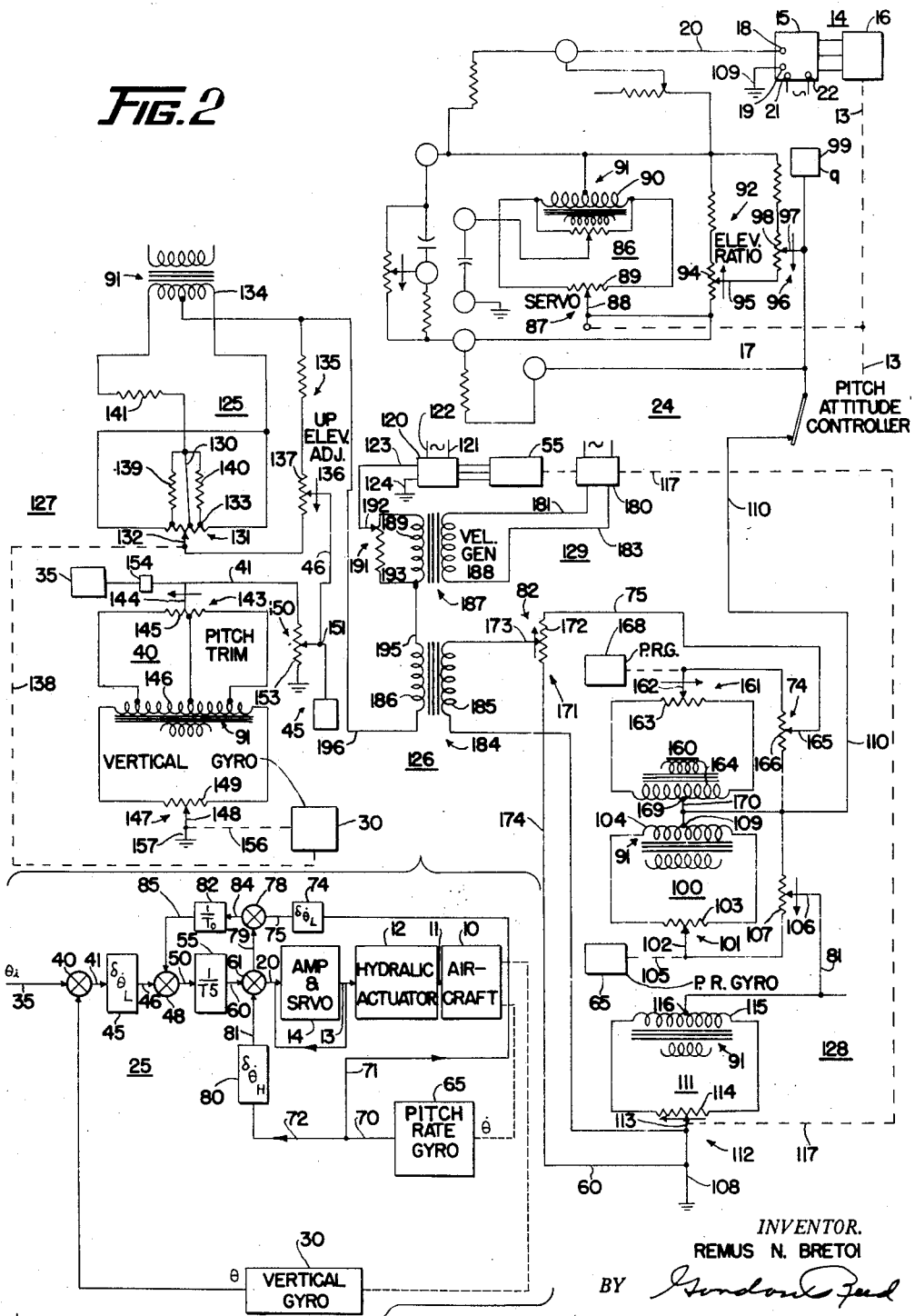

2,953,733

SERVOSYSTEM FOR AUTOMATIC PILOTS

Remus N. Bretoi, Minneapolis, Minn., assignor to Minneapolis-Honeywell Regulator Company, Minneapolis, Minn., a corporation of Delaware Filed Oct. 17, 1955, Ser. No. 540,923

22 Claims. (Cl. 318—489)

The present invention relates to automatic control systems and is particularly adapted for use in automatic control systems for maintaining a condition at a predetermined value. Such condition may be a rate of flow in a process control, a predetermined flight attitude or flight path control for an aircraft, a desired temperature, a desired pressure or similar condition which it is desirable to maintain at a predetermined value. The invention will be disclosed as being applied to an automatic pilot for an aircraft which may maintain a predetermined attitude or flight path.

Automatic control systems have been provided heretofore which were responsive to the magnitude of departure of a condition from a predetermined value and also were additionally controlled in accordance with the rate of change of said departure for maintaining the condition at a desired value or datum. The present invention also utilizes a control system responsive to control effects proportional to the magnitude in departure of a condition from a predetermined value and responsive also to control effects proportional to the rate of change in said condition for maintaining the condition at a predetermined value. However, the present invention utilizes such displacement and displacement rate control effects in a novel manner to obtain a desirable mode of operation for maintaining the condition at a predetermined value.

In the present instance where the invention is applied to an automatic pilot, one object of the invention is to utilize a device responsive to the displacement or magnitude of change in the craft from a predetermined datum and to apply the response of said device to an automatic gain control in the automatic pilot which provides a high gain at low frequencies of a disturbance, tending to change the craft from its original datum, but which decreases the gain for high rates of frequency of the disturbance. Consequently, at the low frequencies, the craft is quickly restored to its original datum but at the high frequencies a longer period of time is required to restore the craft to datum. The longer period of time of restoration for the higher frequency rates of the disturbances are provided to avoid exciting or inducing high frequency oscillations of the aircraft which might otherwise develop had not the gain been automatically reduced with the higher rates of frequency of the disturbance.

A further object of this invention is in effect to increase the static margin of the aircraft or increase its tendency to return to the attitude from which it was disturbed and thus increase the stability of the aircraft by modifying the response of the displacement rate device in which the modification of the response is effected by a lag device.

Another object of the invention is to utilize in combination with structure relating to the first two objects a third feature which is provided by modifying the rate of change of displacement of the craft from datum through a modifying member to provide a high passed rate. It will be noted in Figure 1 that a rate effect is applied directly to the amplifier-servo combination 14 by member 81, a summing device 61 and connection 20 and that part of the control effect on member 81 is also passed through the integrator 55 by the member 79, summing device 78, member 84, gain control 82, member 85, summing device 48, and member 50, integrator 55, and connector 60 to summing device 61 and connector 20 to the amplifier-servo 14. This control which initiates from sub-member 81 is what may be termed "high passed pitch rate input." Such combination comprises a control system input whereby the three characteristic features of displacement gain, lagged pitch rate, and high passed pitch rate controls maintain the craft in a given condition.

A further object of the invention is to utilize a closed loop integrator in combination with a response proportional to the displacement of the craft from a given datum, and with a response proportional to the craft rate of change of displacement from a given datum for maintaining the craft at the predetermined datum.

A further object of the invention is to utilize a closed loop integrator having a selective value of time constant which integrator is responsive to the signal proportional to the magnitude of departure of the craft from a datum and a signal which is proportional to the craft rate of change of magnitude from datum.

The above and further objects of the invention and the means whereby they are attained may be had by a consideration of the following description taken in connection with the accompanying drawing wherein:

Figure 1 illustrates a block diagram of the invention applied to an aircraft and Figure 2 illustrates an electrical schematic arrangement of the device in Figure 1.

The pitch axis configuration proposed is a flight path type of autopilot. Fight path angle is derived from the readily measured pitch attitude by lagging the attitude signal with a selected time constant scheduled with dynamic pressure. The derivatives of flight path angle are obtained from pitch rate signals which are lagged or high passed.

Control of flight path angle has advantages over control of pitch attitude. Rate of climb is directly proportional to the flight path angle. An attitude control mode is added to the basic pitch attitude mode. Normal acceleration is proportional to the rate of change of flight path angle. A normal acceleration mode, if desired, is easily integrated into the system by switching from the lagged pitch attitude feedback to an integrated normal acceleration feedback.

The autopilot feedbacks have direct effects which are easily understood. To artificially increase the airplane damping, the high-passed pitch rate feedback is increased. An increase in the lagged pitch rate feedback increases the natural frequency in pitch (i.e., artificially moves the airplane neutral point aft). Such a system lends itself well to scheduling so that the large changes in airplane characteristics that occur between the subsonic and supersonic regimes or conditions of flight may be readily accommodated.

Referring to Figure 1, the invention is shown as applied to the control of an aircraft about its pitch axis. Such aircraft may be controlled about its pitch axis by a conventional elevator control surface but it is contemplated that the invention will relate to other means for altering the position of the craft about its pitch axis. In the block diagram of Figure 1, an aircraft 10 includes means such as an elevator control surface for controlling the attitude of the craft about its pitch axis. Such control surface may be displaced from a normal position by an operating means 11 extending from a hydraulic servomotor or actuator 12. The hydraulic actuator may be of the type disclosed in U.S. Patent No. 2,646,947, dated July 28, 1953, to Kutzler et al. The hydraulic actuator 12 is reversibly controlled through an operating means 13 from a servomotor means 14. The servomotor means 14 for positioning the operating means 13 may be an A.C. discriminator amplifier two-phase motor combination as shown in the aforesaid patent of Kutzler et al., but it is contemplated that such motor-amplifier combination may be replaced by an A.C. discriminator, relay operating amplifier-D.C. electric servomotor combination similar to that shown in U.S. Patents No. 2,425,733 and No. 2,425,734 to Willis H. Gille et al.

The amplifier-servomotor combination is controlled through a connection 20 by a control system 25. This control system may be a balanceable network having various sources of control signals. One source of control signal is a vertical gyroscope 30 responsive to angular changes in the pitch attitude of the craft 10 about its lateral axis. A second source of control signal is derived from a pitch command device 35. The vertical gyroscope pitch attitude and pitch command signals are combined at summing means 40 and applied to a gain device 45 by a connection 41. The gain device 45 will modify the input thereto from connection 41 in accordance with some variable such as altitude. The output from the device 45 is transmitted by connection 46 to a second summing device 48. From the second summing device 48 the control is further transmitted by connection 50 to an integrator 55. This integrator 55 has a transfer function $1/s$, where $s$ is the mathematical differential operator or complex variable as in the direct Laplace transform. The control is continued from the output member 60 of the integrator 55 to a third summing device 61 and thence by way of conductor 20 to the servo amplifier-motor combination 14. In addition to the displacement signals derived from the vertical gyro 30 and the pitch command device 35, rate signals are also utilized. Such rate signals are provided by a rate gyro 65, for example, responsive to the craft angular rate of change of pitch attitude. The craft pitch rate is transmitted by member 70 extending from rate gyro 65 to two submembers 71, 72. The submember 71 is connected to a gain device 74 which varies the rate gyro response in accordance with the dynamic pressure (Q) of the craft. The output 75 from the gain control 74 is applied to a fourth summing device 78 having an additional input 79 from the third summing device 61. Feeding into the third summing device 61 is the rate gyro response to craft pitch rate over submember 72 which has its operation modified by a gain control 80. The modified rate gyro response is transmitted through conductor 81 to the third summing differential 61. The output from the fourth differential 78 is transmitted by conductor 84 to a gain control device 82 having a transfer function $1/t$. The output from the device 82 is transmitted by conductor 85 to the second summing device 48.

From a further consideration of Figure 1, and considering only the pitch attitude error as reflected in the operation of member 41 due to the difference in signals from the vertical gyro 30 and the pitch command device 35, the pitch attitude error signal is applied to the integrator 55, the integrator 55 through the closed loop feedback arrangement, through the device 82, positions the output member 20 in accordance with the attitude error on member 41. It will be apparent that for slow changes in pitch attitude of the craft about its vertical axis that the integrator 55 along with its feedback will follow very closely the changes in craft pitch attitude. Consequently, the control applied through connection 20 to the servo amplifier-motor combination 14 is substantially in phase with the control from member 41 and if a high gain is derived, a high control effect may be applied through the servo amplifier-motor combination to cause a large control effect to be applied to the aircraft so that it will quickly restored to its original attitude.

However, when the frequency rate of the pitch attitude error signal or frequencies of the disturbances tending to change craft attitude increase, there is a phase lag between the control applied on member 41 of attitude error and the control derived on the connection 20 and applied to the amplifier-motor combination 14. Due to this phase lag, the control surface would also have its operation lagged with respect to the time of occurrence of the disturbance with the result that oscillations of the craft about the desired datum would be set up if the gain of the system were the same as at low frequencies. However, the gain of the attitude error signal on member 41 is reduced by the system so that a smaller elevator displacement or control effect is applied to the craft to correct for a change in craft pitch attitude. With the smaller control effect applied to the craft for its corresponding error signal, the craft does not respond as quickly as it would to a larger control effect. Consequently the effect of the error signal is not perpetuated and the tendency of the craft to oscillate at the higher frequencies of the disturbing influence is prevented automatically.

It will be noted in Figure 1 that a rate effect is applied directly to the amplifier-servo combination 14 by member 81, summing device 61 and connection 20 and that part of the control effect on member 81 is also passed through the integrator 55 by the member 79, summing device 78, member 84, gain control 82, member 85, summing device 48, and member 50, integrator 55, and connecter 60 to summing device 61 and connector 20 to the amplifier-servomotor 14. This control which initiates from submember 81 is what may be termed "high passed pitch rate input." It is evident that for high rates of change of pitch attitude primarily the entire effect from the gain control 80 is applied directly to the amplifier-servomotor and very little effect, because of the time lag involved, is derived from the member 81 through the gain control 82 and integrator 55 which could modify the direct rate control. This high passed pitch rate control provides additional damping of the aircraft without which there may be a tendency to set up oscillations when the craft deviates from its normal position.

The rate control in Figure 1 derived from submember 71 is termed "lagged pitch rate" control since it, in all cases, must pass through the gain control 82 and integrator 55 before it can apply any control effect on the amplifier-servomotor combination 14. By this "lagged pitch rate" attitude input, we increase the static stability or static margin of the aircraft. In effect what is accomplished is that in a theoretical sense the center of lift of the aircraft is moved farther rearward from the center of gravity, the point of rotation of the craft, to increase the moment arm of the lift vector so that it can more readily resist changes in pitch attitude of the craft.

Thus it will be clear from Figure 1 that firstly, the attitude error signal is passed through a lag device comprising an integrator 55 and a gain control 82; secondly, one rate control is applied directly to the amplifier-servomotor 14 for control thereof and also is modified by being passed through a gain control 82 and integrator 55; and that thirdly, a second rate effect is applied through a gain control 74, gain control 82, and integrator 55 and thence to the amplifier-servomotor combination 14. It will also be apparent that there is provided a common gain control 82 and integrator 55 for both the attitude error control and the two types of rate control.

It can be shown that the control equation of the apparatus of Figure 1 with respect to the control input on connection 20 is $$\delta e = \delta \theta_L \frac{\theta - \theta i}{1 + TS} + \delta \dot\theta_L \frac{\dot\theta}{1 + TS} + \delta \dot\theta_H \frac{TS}{1 + TS} \dot\theta$$

wherein the first term is the lagged pitch attitude control, the second is the lagged pitch attitude rate control, the third is the high passed pitch attitude rate control $$\frac{1}{T}$$

is the gain of the integrator 55, $$\frac{1}{S}$$

denotes an integration, $\theta$=pitch attitude error, $\dot{\theta}$=pitch rate, $\delta e$=elevator displacement.

As to the details of some of the system elements, the integrator 55 may be simply an amplifier and a motor with a velocity generator feedback so that the motor rotates at a speed proportional to a control input signal. However, the motor positional feedback through the gain control 82 makes a closed loop system or low pass filter out of the integrator 55. In a sense in Figure 1 therefore pitch rate is summed both ahead and behind this low pass filter, and pitch attitude is summed ahead of the low pass filter i.e., pitch attitude and one pitch rate signal first pass through integrator 55 before controlling amplifier 14 whereas another pitch rate signal is applied simultaneously to integrator 55 and amplifier 14. This makes the elevator deflection a function of high pass pitch rate, lagged pitch rate, and the lagged pitch attitude. This deflection has been stated in equation form above where the quantities $\delta\theta_L$, or elevator deflection/degree lagged pitch attitude, $\delta\dot{\theta}_L$ or elevator deflection/degree lagged pitch rate, and $\delta\dot{\theta}_H$ or elevator deflection per degree high passed pitch rate are the gain controls 45, 74, and 80.

In Figure 2, the invention is illustrated as embodied in an electrical type of control system although mechanical or hydraulic control systems are also contemplated. In Figure 2, the amplifier-servomotor combination 14 comprises a servomotor 16 and amplifier 15. The servomotor 16 in operation positions output means 13 which effects through actuator 12 operation of the elevator control surface of an aircraft to control craft pitch attitude. The elevator surface in the type of control system contemplated may be also positioned by direct manual operation of the control column of the craft. The motor 16 is reversibly controlled from an A.C. discriminator amplifier 15. The amplifier includes a pair of A.C. voltage signal terminals 18, 19 and additional terminals 21, 22 connected to an A.C. source of supply voltage. The servomotor 16 operates in one or another direction depending upon the phase relationship between the voltage across terminals 18 and 19 with respect to the voltage across terminals 21, 22. The amplifier-servomotor combination may be such as stated as disclosed in U.S. Patent No. 2,425,734 to Willis H. Gillie et al. dated August 19, 1947.

A.C. control signals are supplied to amplifier 15 from a balanceable control circuit 24. The balanceable control circuit is illustrated in the form of a balanceable potentiometer bridge network. The control circuit comprises, beginning with amplifier terminal 18, a conductor 20, a servobalance potentiometer network 86, conductor 110, pitch rate potentiometer network 100, conductor 81, potentiometer integrator network 111, conductor 108, to ground and return through amplifier ground conductor 109 to amplifier terminal 19.

Potentiometer network 86 comprises a servo balance potentiometer 87 having a slider 88 and resistor 89, a transformer 91 with a secondary winding 90, an elevator ratio potentiometer 92 having a resistor 94 and slider 95, and a gain control potentiometer 96 having an adjustable slider 97 and resistor 98. The resistor 89 is connected across the secondary winding 90. Slider 88 is displaced in either direction from the electrical center of resistor 89 in accordance with the displacement of servomotor 16 from a normal position. The operation is effected through operating means 13, 17 connecting servomotor 16 with slider 88. A signal is developed between slider 88 and the electrical center of resistor 89 in accordance with the direction and magnitude of displacement of the slider from its normally centered position. Elevator ratio potentiometer 92 has its resistor 94 connected across the center tap of secondary winding 90 having the same potential as the electrical center of resistor 89 and slider 88. Slider 95 may be adjusted along resistor 94 to select a desired portion of the voltage developed between slider 88 and the electrical center of resistor 89. Resistor 98 of the gain control potentiometer 96 is connected across the center tap of secondary winding 90 and adjustable tap 95. The slider 97 is positioned along resistor 98 from a "Q" sensor 99 which senses the ratio between the dynamic pressure and the static pressure affecting the aircraft in flight. Conductor 20 is connected to the center tap of secondary winding 90.

Potentiometer network 100 comprises a pitch rate potentiometer 101 having a slider 102 and resistor 103; a secondary winding 104 of the transformer 91, and a high passed pitch rate gain control potentiometer having an adjustable tap 106 and resistor 107. Potentiometer resistor 103 is connected across the secondary winding 104 which may be energized from a common primary winding along with secondary winding 90 of network 86 previously described. Slider 102 may be adjusted along resistor 103 in either direction from the electrical center thereof by a pitch rate gyroscope 65, the operation being effected through the connecting means 105. The high passed pitch rate gain control potentiometer resistor 107 is connected between a center tap 109 of secondary winding 104 and the adjustable slider 102. A conductor 110 extends from adjustable tap 97 of the "Q" gain control potentiometer to the center tap 109.

Potentiometer network 111 comprises an integration potentiometer 112 having an adjustable slider 113 and resistor 114, and a secondary winding 116 of transformer 91. A conductor 81 extends from gain control potentiometer slider 106 to a center tap 116 of secondary winding 115. A conductor 108 extends from adjustable slider 113 to ground. The slider 113 is adjusted in either direction from the electrical center of resistor 114 having the same potential as center tap 116 by an integrator motor operating means 117. Under normal conditions with the slider 113 at the electrical center of resistor 114 the potential of slider 113 corresponds with that of the center tap 116 of secondary winding 115.

The operating means 117 is driven by a motor 55 which may be a capacitor type induction motor. The motor 55 is reversibly controlled by an A.C. discriminator amplifier 120.

The amplifier-motor combination may be of the type well known in the art wherein the motor 55 comprises a line winding energized from an A.C. source and an amplifier winding energized from the output of amplifier 120. The amplifier 120 includes conductors 121, 122 connected to an A.C. voltage supply and signal input conductors 123, 124 connected to two amplifier controlled electrodes. The energization of the amplifier winding of motor 55 will either lag or lead the energization of the line winding of the motor depending upon the phase relationship between the control signal across conductors 123, 124 relative to the voltage across the supply conductors 121, 122. The amplifier-capacitor motor combination is old in the art, see for example the U.S. Patent to Upton No. 2,423,534. The amplifier 120 has its input signal conductors 123, 124 connected to a composite control network 126. The control circuit or network 126 comprises branches 127, 128, and 129.

The network 127 comprises an up elevator potentiometer network 130 and a combined pitch trim-vertical gyro pitch attitude network 40. The network 130 includes an up elevator potentiometer 131 having a slider 132 and a center tapped resistor 133; secondary winding 134 of transformer 91, an up elevator adjustment potentiometer 135 having an adjustable tap 136 and resistor 137; and resistors 139, 140, and 141. One end of secondary winding 134 is directly connected to both ends of the potentiometer resistor 133. Resistor 139 extends from one end of resistor 133 to the center tap of resistor 133 and one end of resistor 140 is connected to one end of resistor 133 and to the center tap of resistor 133. Resistor 141 is connected between the center tap of resistor 133 and the opposite end of secondary winding 134. The resistor 137 of the up elevator adjustment potentiometer 135 is connected between a center tap of secondary winding 134 and slider 132. Tap 136 may be adjusted in either direction to select a desired portion of the voltage signal developed in network 130 between the center tap of secondary winding 134 and potentiometer slider 132. To develop control signals, slider 132 is positioned in either direction from a center tap of resistor 133 by an operating means 138 positioned from a vertical gyroscope 30 in accordance with the bank angle of the aircraft. In normal level flight, the slider 132 is at the center tap of resistor 133.

Network 40 comprises a trim potentiometer 143 having an adjustable slider 144 and resistor 145; a secondary winding 146 of transformer 91; a vertical gyro pitch attitude potentiometer 147 having an adjustable slider 148 and resistor 149; and a gain control 45 comprises a network gain selector potentiometer 150 having an adjustable tap 151 and resistor 153. Potentiometer resistors 145 and 149 are connected in parallel across the secondary winding 146, with resistor 145 being connected at intermediate points of the secondary winding while resistor 149 is connected across the entire secondary winding. The gain control potentiometer resistor 153 has one end connected to adjustable slider 144 and its opposite end connected to ground. A conductor 46 extends between adjustable tap 136 of the up elevator adjustment to adjustable tap 151. Slider 144 is adjusted or positioned in either direction from the electrical center of resistor 145 which has a potential corresponding to the center tap of secondary winding 146. The adjustment is effected from device 35 through a slip clutch 154. The arrangement is such that slider 144 may engage a stop during either direction of its movement prior to its reaching the extremity of resistor 145. Potentiometer slider 148 is positioned in either direction from the electrical center of resistor 149 by an operating means 156 extending thereto from the vertical gyro 30. The displacement of slider 148 from an electrical center of resistor 149 varies in accordance with the pitch attitude of the aircraft. A conductor 157 extends from slider 148 to ground and thus the voltage selected from network 40 depends upon the adjustment of adjustable tap 151.

The network 128 comprises a pitch rate gyro potentiometer network 160, pitch rate gyro network 100 and integrator network 111 both previously described, and a gain control 82. The network 160 comprises a lagged pitch rate potentiometer 161 having an adjustable slider 162 and resistor 163; a secondary winding 164 of the transformer; and a lagged pitch rate gain control 74 comprising an adjustable slider 165 and potentiometer resistor 166. Resistor 163 is connected across the secondary winding 164. Slider 162 is positioned in either direction from the electrical center of resistor 163 by a pitch rate gyroscope 168 responsive to the rate of pitch of the craft.

Both the pitch rate gyroscope 65 and the pitch rate gyroscope 168 are conventional, and they comprise a gyro rotor rotatable about one axis termed the spin axis and pivoted for rotation about a second axis at right angles to the spin axis with the movement about the second axis being restrained so that the displacement of the rotor about the second axis from a normal position varies with the rate of angular movement. The gyroscopes may be installed on the craft to respond to the rate of pitch of the craft or its angular rate about its lateral axis. The pitch rate adjustment resistor 166 is connected across the slider 162 and a center tap 169 of secondary 164. A conductor 170 connects center tap 169 with the center tap 109 of secondary winding 104. The gain control 82 comprises a potentiometer 171 having a resistor 172 and a slider 173. Normally the gain of potentiometer 171 is set at one so that output equals input. A conductor 75 connects one end of resistor 172 to adjustable tap 165 and a conductor 174 connects the opposite end of resistor 172 with adjustable slider 113 of network 111.

Network 129 comprises a velocity signal generator 180. The velocity signal generator 180 may be of the type known in the art as a dynamic transformer and comprises a primary winding and a secondary winding. The primary winding is energized from the A.C. supply and the secondary winding is inductively related to the primary winding by a rotor operated by the motor 55. The magnitude of the voltage induced in the secondary winding varies with the speed of rotation of the motor 55. The output of the velocity signal generator 180 is applied across the dynamic transformer secondary winding output conductors 181, 183.

The algebraic summing of control voltages from networks 127, 128, and 129 is effected through two isolating transformers 184, 187. Transformer 184 comprises a primary winding 185 and secondary winding 186. The primary 185 is connected across an adjustable tap 173 and slider 113 of network 128. The primary winding 188 of transformer 187 is connected to the conductors 181 and 183 of the velocity signal generator 180. A voltage divider or integrator time constant adjustment potentiometer 191 has its resistor 193 connected across the secondary winding 189 of transformer 187. The adjustable tap 192 of the transformer is connected to amplifier conductor 123. One end of secondary winding 189 is connected to one end of secondary winding 186 by conductor 195 and the opposite end of secondary winding 186 is connected by conductor 196 to the center tap of secondary winding 134 of network 130.

It will now appear that signals developed in the networks 127, 128, or 129 are supplied to the amplifier 120 to effect operation thereof. The amplifier 120 in turn causes the operation of motor 55 which through the operating means 117 adjusts the slider 113 of the integrator network 111 to rebalance the input circuit of amplifier 120 in a closed loop system to terminate its operation. Network 128 develops a voltage opposing motor operation. In the particular arrangement involved the time constant (T) of the motor 55 was made substantially equal to .65 second where T, the time constant of the motor, is equal to 60% of the total time required to develop a full rebalance signal on the amplifier 120. The time constant may be obtained by the adjustment of slider 192 of the gain control 191. The slider 192 may be adjusted in accordance with the dynamic pressure of the craft.

In the pitch rate networks 100 and 160, the phase of the two signals obtained from the two networks is the same for the same value of pitch rate of the craft. However, the adjustment of the pitch rate gain potentiometer sliders 106 and 165 differs. The gain of the high passed pitch rate network 100 in one successful application was made approximately equal to .40 whereas that for the lagged pitch rate network 160 was substantially .575. The values of the gain adjustments for the networks 100 and 160 depends upon the characteristics of the aircraft being controlled. In some types of aircraft, the gain adjustments may be varied from that given in the present instance. It is possible also that the required gain adjustment might be made in such a direction that a negative or opposed signal would be obtained from one rate network as compared to that from the other rate network. Where such negative signal is obtained, a different arrangement of the particular pitch rate gyro network concerned would be made. No difficulty would be involved in providing such an arrangement to provide a negative signal.

While Figure 1 has been considered to bring out the function of the apparatus, the up elevator network 130 in Figure 2 may require an explanation. This network functions when the arrangement is applied to the pitch axis of the aircraft and the network 130 provides an up elevator signal when the craft is in a banked turn to thereby prevent loss of altitude of the craft while in such turn.

It will now be apparent that there has been provided for the control of the pitch attitude of a craft about its lateral axis an improved control system which utilizes a displacement control with a high gain during low rates of occurrence of a disturbing frequency to quickly restore the craft to its original attitude but provides a decrease in gain of such displacement control for high rates of occurrence of the disturbing force and that further the system is responsive to displacement rate effects that improve the static margin of the aircraft and provides additional damping of the craft about its normal attitude due to such disturbances.

What is claimed is:

1. Control apparatus for a dirigible craft having operable means for changing craft attitude about an axis thereof, in combination: motor means actuating said operable means; a balanceable network controlling said motor means, and means for supplying to said network a control input signal proportional to a combination of the following terms: lagged attitude change, lagged attitude rate and high passed attitude rate symbolized respectively by $$\left(\frac{1}{1+TS}\right)\theta, \left(\frac{1}{1+TS}\right)\dot{\theta}, \left(\frac{TS}{1+TS}\right)\dot{\theta}$$

wherein $\dot{\theta}$ equals the craft angular rate of change in attitude; and $\theta$ equals the magnitude of the craft change in attitude.

2. Apparatus for operating a condition controlling device comprising: servo means for operating said device; a control means controlling said servo means; first means responsive to the magnitude of change in said condition; a second means responsive to the magnitude of the rate of change in said condition; and motor operated integrator means having input means responsive to said first and second means and having an output means; and connections from said second and motor operated output means to said control means to supply thereto a resultant control signal proportional to a combination of the following terms $$\left(\frac{1}{1+Ts}\right)\theta, \left(\frac{1}{1+Ts}\right)\dot{\theta}, \dot{\theta}\left(\frac{Ts}{1+Ts}\right)$$

for stabilizing the condition at a predetermined magnitude, wherein $\theta$ is the magnitude of change in the condition; $\dot{\theta}$ is the rate of change in the conduition; T is in accordance with the motor time constant which is related to the operation velocity of the motor operated integrator means and its ultimate extent of operation, and $s$ is the conventional Laplace mathematical operator.

3. In a condition control system for operating a control device, combining means for producing a resultant control signal corresponding to a desired operation of said device, a first means for supplying a displacement signal, further means for supplying a plurality of displacement rate signals, motor means responsive to said displacement and plurality of rate signals, follow-up providing means operated by said motor means and in turn connected thereto to oppose the displacement and rate signals, and means for connecting said motor operated follow-up signal providing means and a portion of the further means supplying one rate signal to said combining means to provide a resultant signal therein corresponding to a resultant of the displacement signal lagged, one rate signal lagged, and another rate signal as modified substantially by a high passed filter, the resultant signal being thereby constituted of these components symbolized as $$\theta\left(\frac{1}{1+TS}\right), \dot{\theta}\left(\frac{1}{1+TS}\right), \dot{\theta}\left(\frac{TS}{1+TS}\right)$$

wherein $\theta$ is the magnitude of change in the condition and $\dot{\theta}$ is the rate of change in the condition.

4. The apparatus of claim 3, and a servo means connected to said combining means and adapted to operate said control device.

5. The apparatus of claim 4, and a rebalancing signal providing device operated by said servo means and connected in opposition to said resultant signal to said combining means.

6. In a control system for operating a control device, combining means for producing a resultant control signal corresponding to a desired operation of said device, a first means for providing a displacement signal, further means for supplying a plurality of displacement rate signals, motor means having a transfer function $$\frac{1}{TS}$$

and responsive to said displacement and plurality of rate signals, follow-up signal providing means operated by said motor means and connected to control said motor means in opposition to said displacement and rate signals, and means connecting said follow-up signal providing means and a portion of the further means supplying one rate signal to said combining means to provide the resultant signal having components of lagged attitude, lagged attitude rate, and high passed pitch rate corresponding to $$\theta\left(\frac{1}{1+TS}\right), \dot{\theta}\left(\frac{1}{1+TS}\right), \dot{\theta}\left(\frac{TS}{1+TS}\right)$$

7. In an aircraft flight control apparatus, in combination: motor means operative to control the direction of flight of the aircraft, signal input circuit means controlling operation of the motor means, integrating means having a time constant adjusted in accordance with a flight condition for supplying in said circuit means a resultant signal proportional to the integral of change of direction, and follow-up means operated by the motor means operative to supply a signal to the input circuit opposing the resultant signal.

8. In an aircraft flight control apparatus in combination: means for producing a signal voltage proportional to the craft rate of departure from course, first means responsive to said departure rate signal adapted to produce a first component voltage proportional to the rate of change of said signal voltage, further means responsive to said departure rate signal adapted to produce a second component voltage proportional to the integration of said departure rate signal, actuating means controlling craft course, and a control circuit connected to the actuating means adapted to receive said first and second component voltages said second component voltage opposing said first component voltage in said control circuit.

9. Control apparatus for operating a condiiton controlling device comprising: servomotor means operating said device; a control means controlling said servomotor means; a first signal providing means responsive to the rate of change in said condition; a second signal providing means responsive to the rate of change in said condition, said providing means including modifying means so that said first and second signals are unequal; a third signal providing means; a motor means operating said third signal providing means; further means including a balanceable network controlling said motor means and connected to said first, second, and third signal providing means; and additional means controlling said servomotor control means from said second and third signal providing means.

10. Control apparatus for an aircraft having an attitude controlling device for controlling the craft's angular position about its pitch axis, said apparatus comprising: servo means operating said attitude controlling device; a first balanceable control means controlling said servo means; a first signal voltage providing means responsive to the rate of change of a condition; a second signal voltage providing means responsive to the rate of change in said condition, one of said signal providing means including signal gain modifying means whereby said signal voltages being unequal; a third signal voltage providing means; a motor means operating said third signal providing means; a further balanceable means controlling said motor means and connected to said first, second, and third signal providing means; and additional means controlling said first servomotor control means from said second and third signal providing means, for increasing the static stability of said craft and for damping angular movement of the craft about its pitch axis.

11. Control apparatus for an aircraft having a pitch attitude controlling device, said apparatus comprising: servo means operating said device; a balanceable control means controlling said servo means; a first signal providing means responsive to the displacement of the craft about said axis; a rebalancing second signal providing means; a motor means operating said second signal providing means; further means controlling said motor means from said first and second signal providing means; a velocity signal generator operated by said motor opposing said first signal providing means for additionally controlling said motor means; gain control means for said velocity signal generator connected to said further means to vary the effective output thereof for selectively changing the time required for the motor means to effect rebalance of said further means through said second signal providing means; a third signal providing means operated by said servo means; and means controlling said servo means control means from said second and third signal providing means.

12. Control apparatus for operating a condition controlling device comprising: servo means operating said controlling device; a control means controlling said servo means; a first signal providing means responsive to the rate of change in said condition; a second signal providing means responsive to the rate of change in said condition, said signal providing means being differently constituted and connected so that said signals are unequal but reinforce each other; a third signal providing means responsive to the displacement of said condition from a predetermined magnitude; a fourth signal providing means; a fifth signal providing means; a motor means operating said fourth signal providing means in accordance with the motor velocity; operating connections from said motor means to said fifth signal providing means to provide a signal in accordance with motor means displacement; further means controlling said motor means from said five signal providing means wherein said first, second, and third signals are opposed by said fourth and fifth signals while said third signal is increasing; and additional means controlling said servo means control means from said second and fifth signal providing means.

13. In control apparatus for an aircraft having a pitch attitude controlling device, in combination: servo means operating said device; a balanceable control means controlling said servo means; a first signal providing means responsive to the rate of change in pitch attitude; a second signal providing means responsive to the rate of change in craft pitch attitude; means for relatively modifying the magnitude of said first and second signals; a third signal providing means operated in accordance with the departure in pitch attitude of the craft; a fourth signal providing means comprising velocity signal generator; a gain control for said velocity signal generator; a motor displacement signal providing means; a motor means operating said velocity signal generator and said motor displacement signal providing means; further means controlling said motor means from said modified first and second signals and also from said third, fourth and motor displacement signals; and additional means controlling said servo means control means from said motor displacement signal providing means and the modified second signal whereby said pitch attitude controlling device of the aircraft is positioned in accordance with the lagged pitch attitude change of the craft, the lagged pitch rate change in attitude of the craft, and the highpass pitch rate change in attitude of the craft.

14. Control apparatus for an aircraft having an attitude controlling device, said apparatus comprising: servo means operating said device; a control means controlling said servo means; a first signal voltage providing means responsive to the pitch attitude of the craft; a second signal voltage providing means responsive to the rate of change in said craft pitch attitude; adjustable means for modifying the magnitude of the signals derived from the first and second signal providing means; a third signal voltage providing means; a motor means operating said third signal providing means; further means including a balanceable network controlling said motor means from said modified first and second signals and from said third signal providing means wherein said first and second signals reinforce each other while said first signal is increasing; and additional means connected to the control means for controlling said servo control means from said modified second and third signals, to stabilize the pitch attitude of the craft, said motor means serving to filter high frequency transient changes in craft attitude derived from said first signal voltage while transmitting low frequency changes in craft attitude.

15. In an aircraft flight control apparatus, in combination: motor means operative to control the direction of flight of the aircraft; signal input circuit means controlling operation of the motor means; integrating means for supplying in said circuit means a resultant signal proportional to the integral of change of direction; means for adjusting the time constant of the integrating means in accordance with a flight condition; and follow-up means operated by the motor means operative to supply a signal to the input circuit opposing the resultant signal.

16. Flight control apparatus for an aircraft having a pitch attitude control device, in combination: servo means positioning said device; control signal input circuit means controlling operation of the servo means; means responsive to the change in pitch attitude of the craft providing a pitch attitude error signal; integrating means responsive to said pitch attitude signal for supplying in said circuit means a resultant signal proportional to the time integral of change of pitch attitude; means for varying the time constant of said integrating means; and follow-up means operated by the servo means operative to supply a signal to the input circuit opposing the resultant signal, said integrating means serving to filter high frequency transient changes in craft pitch attitude derived from said attitude error while transmitting low frequency changes in craft pitch attitude to said circuit means.

17. Control apparatus for operating a condition controlling device comprising: servomotor means operating said device; a control means controlling said servomotor means; a first alternating voltage signal providing means responsive to the rate of change in said condition; a second alternating voltage signal providing means responsive to the rate of change in said condition; a third signal providing means; a motor means operated by said third signal providing means; further means including a balanceable voltage network controlling said motor means and connected to said first, second, and third alternating voltage signal providing means; and additional means controlling said servomotor control means from said second and third alternating voltage signal providing means.

18. In an aircraft flight control apparatus in combination: means for producting a signal voltage varying with the craft rate of change of pitch attitude; first means responsive to said attitude rate signal adapted to produce a first component voltage varying with the rate of change of said attitude rate signal voltage; further means responsive to said attitude rate signal adapted to produce a second component voltage in accordance with the integration of said attitude rate signal; actuating means controlling craft attitude; and a control circuit connected to the actuating means adapted to receive said first and second component voltages; and means to adjust the time constant of the further means which integrates the attitude rate signal.

19. Flight control apparatus for an aircraft having an elevator surface for controlling pitch attitude, said apparatus comprising: servo means operating said elevator surface; signal input circuit means controlling operation of the servo means; means providing an attitude error signal; motor operated integrating means controlled by said attitude error signal for supplying in said circuit means a resultant signal in accordance with the integral of the attitude error; means for adjusting the time constant of the integrating means; and follow-up means operated by the servo means to supply a signal to the input circuit opposing the resultant signal, said motor operated integrating means serving to filter high frequency changes in craft pitch attitude control derived from said attitude error signal while transmitting low frequency attitude control changes.

20. Control apparatus for an aircraft having operable means for changing craft attitude about an axis thereof, in combination. motor means actuating said operable means; means for providing a signal in accordance with a flight path angle of the aircraft; means for providing a signal for increasing in effect the natural frequency of the aircraft about said axis; means for providing a signal for increasing the damping of the aircraft; means providing a signal in accordance with the displacement of said motor means; and means combining said four signals and controlling the said motor means in accordance with the algebraic sum thereof.

21. Control apparatus for an aircraft having operable means for changing craft attitude about an axis thereof, in combination: motor means actuating said operable means; means providing a signal in accordance with the lagged pitch attitude of the aircraft; means providing a signal in accordance with the lagged pitch rate of the aircraft; means providing a signal increasing the damping of the aircraft about said axis; and means combining said signals and controlling said motor means in accordance with the algebraic sum thereof.

22. Control apparatus for a dirigible craft having operable means for changing craft attitude about an axis thereof, in combination: means providing a first signal in accordance with the lagged attitude change of the craft; means for providing a signal tending to increase the natural frequency of the craft about said axis; means providing a high passed attitude rate signal to increase the damping of said aircraft; and means responsive to said signals and controlling said motor means in accordance with the algebraic sum thereof.

References Cited in the file of this patent

UNITED STATES PATENTS

| | | |
|---|---|---|
| 2,548,278 | Wirkler | Apr. 10, 1951 |
| 2,679,366 | Noxon | May 25, 1954 |

OTHER REFERENCES

"Servomechanism Fundamentals," Lauer, Lesnick, Matson, First Edition, page 209, Figs. 8–23, McGraw-Hill, New York, 1947.